(12) United States Patent
Matsuura et al.

(10) Patent No.: US 8,403,366 B2
(45) Date of Patent: Mar. 26, 2013

(54) VEHICLE BODY STRUCTURE FOR MOUNTING WASHER TANK TO VEHICLE BODY

(75) Inventors: Shuken Matsuura, Wako (JP); Toshihiko Hatakeyama, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 55 days.

(21) Appl. No.: 12/906,300

(22) Filed: Oct. 18, 2010

(65) Prior Publication Data

US 2011/0089720 A1    Apr. 21, 2011

(30) Foreign Application Priority Data

Oct. 19, 2009   (JP) .................................. 2009-239953

(51) Int. Cl.
*B60P 3/22* (2006.01)
(52) U.S. Cl. ....................................................... 280/830
(58) Field of Classification Search .................. 280/830, 280/562; 239/284.1, 284.2
See application file for complete search history.

(56) References Cited

U.S. PATENT DOCUMENTS

| | | | | |
|---|---|---|---|---|
| 3,117,727 A | * | 1/1964 | Pollock et al. ............. | 239/284.2 |
| 4,318,510 A | * | 3/1982 | Koike ......................... | 239/284.2 |
| 4,346,865 A | * | 8/1982 | Murata ....................... | 248/311.2 |
| 4,465,254 A | * | 8/1984 | Murata et al. .............. | 248/311.2 |
| 5,000,333 A | * | 3/1991 | Petrelli ....................... | 220/890 |
| 5,280,868 A | * | 1/1994 | Ueno et al. ................. | 248/205.1 |
| 5,826,845 A | * | 10/1998 | Lounsbury et al. ........ | 248/224.61 |
| 7,798,690 B2 | * | 9/2010 | Watanabe et al. .......... | 362/539 |
| 7,829,819 B2 | * | 11/2010 | DeMaria et al. ............ | 219/122 |
| 2008/0142524 A1 | * | 6/2008 | Thomas et al. ............. | 220/562 |
| 2008/0296918 A1 | | 12/2008 | Mueller et al. | |
| 2010/0237171 A1 | * | 9/2010 | Rathey et al. .............. | 239/284.1 |

FOREIGN PATENT DOCUMENTS

| | | |
|---|---|---|
| EP | 1084920 | 3/2001 |
| FR | 1572482 | 6/1969 |
| FR | 2598129 | 11/1987 |
| FR | 2609437 | 7/1988 |
| GB | 2116921 | 10/1983 |
| JP | 61-80143 | 5/1986 |
| JP | 2-103820 | 8/1990 |
| JP | 2-110567 | 9/1990 |
| JP | 2-141529 | 11/1990 |
| JP | 05-294148 | 11/1993 |
| WO | WO 2009049759 A1 * | 4/2009 |

* cited by examiner

*Primary Examiner* — Tashiana Adams
(74) *Attorney, Agent, or Firm* — Rankin, Hill & Clark LLP

(57) ABSTRACT

There is provided a vehicle body structure for mounting a washer tank to a vehicle body, which prevents a fog lamp as a functional part in vicinity of the washer tank from being damaged when the fog lamp comes in contact with the washer tank at the time of a light collision. The vehicle body structure for mounting a washer tank includes a washer tank for being mounted to the vehicle body; and a fog lamp provided at a more frontward position than the washer tank in a traveling direction of the vehicle body, wherein the washer tank is provided with a through hole at a position opposing the fog lamp, and the through hole penetrates through the washer tank in the traveling direction of the vehicle body.

18 Claims, 3 Drawing Sheets

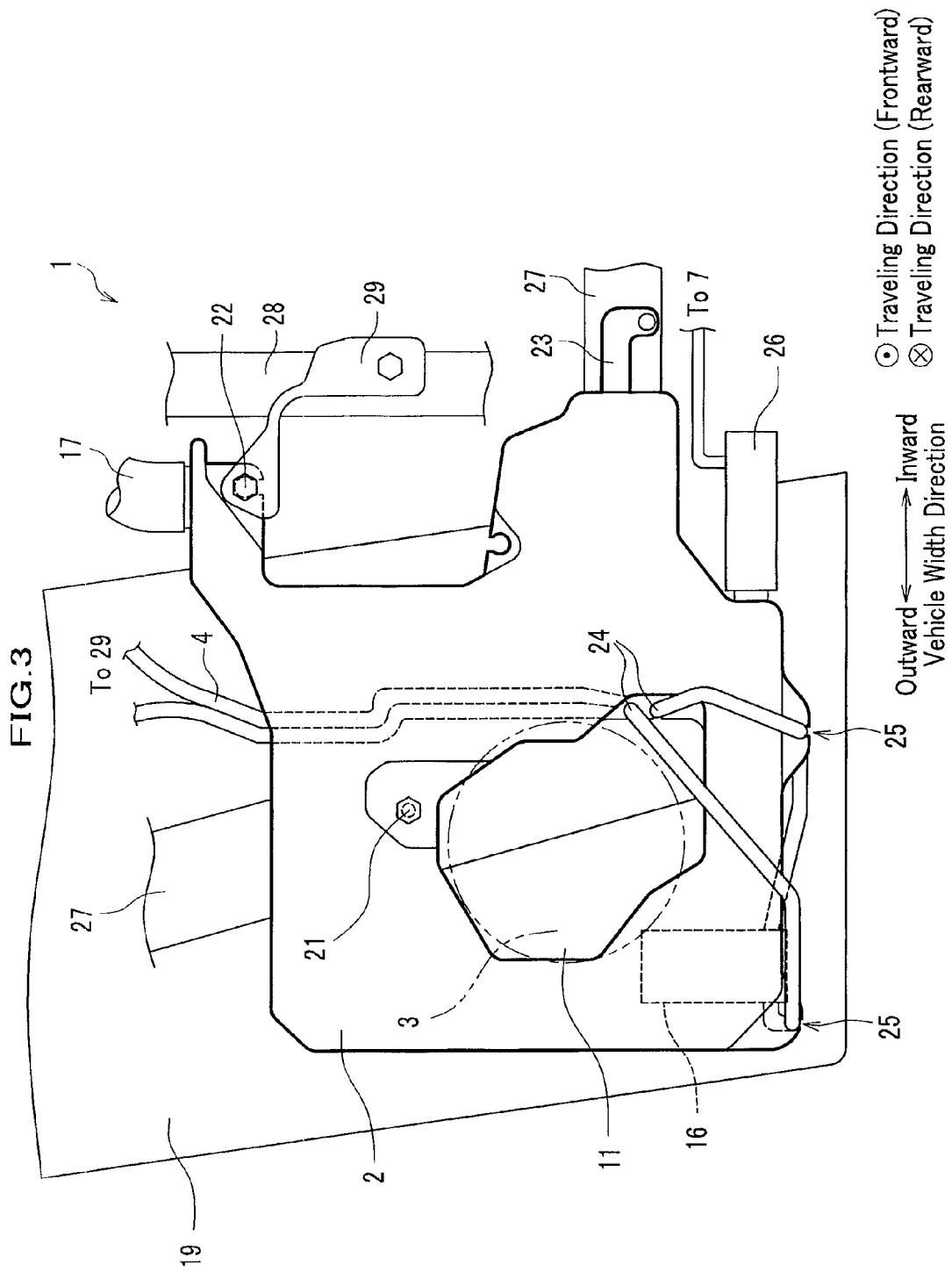

VEHICLE BODY STRUCTURE FOR MOUNTING WASHER TANK TO VEHICLE BODY

CROSS-REFERENCE TO RELATED APPLICATION

This application claims the foreign priority benefit under 35 U.S.C. §119 of Japanese Patent Application No. 2009-239953 filed on Oct. 19, 2009, the disclosure of which is incorporated herein by reference.

BACKGROUND OF THE INVENTION

1. Field of the Invention

The present invention relates to a vehicle body structure for mounting a washer tank to a vehicle body.

2. Description of the Related Art

In a conventional vehicle body structure, various functional parts are included in an engine compartment with a limited space, and a washer tank is one of such various functional parts. It has been suggested that such a washer tank not only reserves washer solution but also functions as a buffer at the time of a vehicle collision (for example, as disclosed in JPH02-103820 U).

However, there has been a problem that, if a washer tank is disposed in vicinity of other functional parts such as a lamp body, the washer tank comes in contact with the lamp body even at the time of a light collision so that the lamp body may be damaged and needed to be replaced.

To counter this problem, the present invention has an object to provide a vehicle body structure for mounting a washer tank to a vehicle body, which prevents a functional part in vicinity of the washer tank from being damaged when contacting the washer tank at the time of a light collision.

SUMMARY OF THE INVENTION

In one aspect of the present invention, there is provided a vehicle body structure for mounting a washer tank to a vehicle body including a washer tank for being mounted to the vehicle body; and a functional part provided at a more frontward position than the washer tank in a traveling direction of the vehicle body, wherein the washer tank is provided with a through hole at a position opposing the functional part, and the through hole penetrates through the washer tank in the traveling direction of the vehicle body.

According to this feature of the present invention, even when the functional part moves toward the through hole at the time of a light collision, the through hole prevents the functional part from interfering with the washer tank, or secures a longer moving distance until the functional part interferes with the washer tank, so that it is possible to prevent the functional part from coming in contact with the washer tank to be damaged. When the functional part gets damaged and needs to be replaced, a mechanic or the like can readily operate maintenance work on the functional part through the through hole.

In the present invention, it is preferable that the washer tank is provided outwardly in a vehicle width direction of the vehicle body that is perpendicular to the traveling direction of the vehicle body, the through hole is formed to be outwardly offset relative to the washer tank in the vehicle width direction of the vehicle body, and in the washer tank, an outward section disposed more outwardly than the through hole has a smaller width than that of an inward section on an opposite side to the outward section across the through hole.

According to this feature of the present invention, since a mechanic or the like can readily operate maintenance work via the through hole from the outside of the vehicle width direction, it is possible to enhance a performance of maintenance work on the functional part.

In the present invention, it is also preferable that a washer pump is provided outwardly in the vehicle width direction that is perpendicular to the traveling direction of the vehicle body, and at least one pipe connected with the washer pump is installed through the through hole and inwardly in the vehicle width direction of the vehicle body.

According to this feature of the present invention, since there is no necessity of installing the pipe all around the washer tank, it becomes easier to handle the pipe, and the pipe can be installed through the through hole, so that it is unlikely that the pipe becomes bent, thereby to enhance flexibility of the piping layout.

In the present invention, it is also preferable that the pipe is locked to an edge of the washer tank that faces the through hole. According to this feature of the present invention, the pipe can be locked without being bent, so that it is possible to stabilize the pipe installation condition.

In the present invention, it is also preferable that the washer tank is provided at an edge of the washer tank that faces the through hole with a first mounting portion for mounting the washer tank to the vehicle body. According to this feature of the present invention, the washer tank can be mounted to the vehicle body closely to the center of gravity of the washer tank, so that the mounting condition of the washer tank can be stable.

In the present invention, it is also preferable that the washer tank is provided with a pair of second mounting portions at a more inward position than the first mounting portion in the vehicle width direction of the vehicle body, and one of the second mounting portions is disposed at a higher position and the other of the second mounting portions is disposed at a lower position than the first mounting portion, respectively. According to this feature of the present invention, since the washer tank is fixed at three points of the first mounting portion and the pair of second mounting portions in total, it is possible to enhance a mounting strength of the washer tank. The washer tank is mounted to the vehicle body inwardly in the vehicle width direction, so that a slight outward displacement of the washer tank in vehicle width direction can be accepted when operating maintenance work on the functional part from the outside of the vehicle width direction.

In the present invention, it is also preferable that the functional part includes a lamp body. According to this feature of the present invention, since the through hole is provided in the washer tank, it is possible to secure a larger surface area of the washer tank that closely opposes the lamp body. Thus, it is possible to efficiently transfer heat generated by the lamp body, thereby to provide an effect to prevent the washer solution from being frozen.

Other features and advantages of the present invention will become more apparent from the following detailed description of the invention when taken in conjunction with the accompanying exemplary drawings.

BRIEF DESCRIPTION OF THE DRAWINGS

FIG. 3 is a perspective view of the washer tank and the vicinity thereof shown in FIG. 1.

DETAILED DESCRIPTION OF THE PREFERRED EMBODIMENTS

Figure 1:
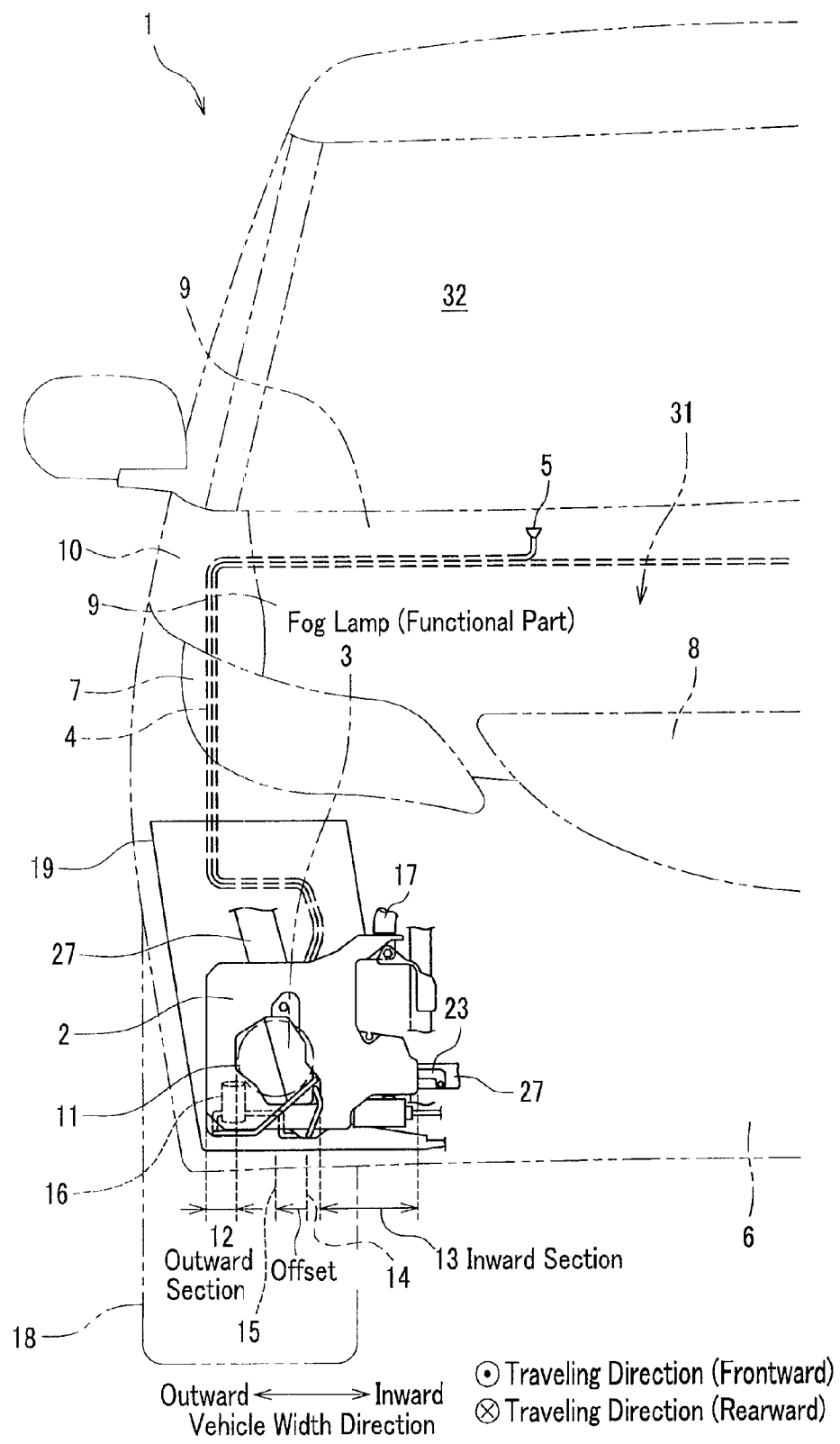
FIG. 1 is a partial front view of a vehicle body, showing only a left side of the vehicle body viewed from a front side of the vehicle body according to an embodiment of the present invention.

Descriptions will be provided on the mounting structure of a washer tank for mounting the washer tank to a vehicle body according to the embodiment of the present invention hereinafter with reference to the drawings. Note that the same numerical references are used for the same components in the drawings, and detailed descriptions will be omitted.

FIG. 1 shows a vehicle body 1 having a vehicle body structure for mounting a washer tank 2 to the vehicle body 1 according to the embodiment of the present invention. FIG. 1 is a partial front view of the vehicle body 1, showing only a left side of the vehicle body 1 viewed from the front side (this side of the paper) toward the rear side (that side of the paper) relative to the traveling direction. A bonnet 9 is provided over an engine compartment 31, and a fender 10 is provided on an outward side of the bonnet 9 in the vehicle width direction of the vehicle body 1. There are provided a head light 7 and a front grill 8 beneath the bonnet 9. A bumper 6 is provided beneath the head light 7 and the front grill 8. A fog lamp (a functional part as a lamp body) 3 is embedded in the bumper 6 outwardly in the vehicle width direction of the vehicle body 1. A wheel house 19 is provided at a more rearward position than the fog lamp 3 in the traveling direction of the vehicle body 1 and under the fender 10 on an outward side of the vehicle width direction of the vehicle body 1. A tire 18 that is a front wheel is housed in the wheel house 19. The wheel house 19 partitions the engine compartment 31 from the external of the vehicle body 1, and protects the functional parts in the engine compartment 31 from clay splash or the like. On the other hand, when maintenance work is operated on the vehicle body 1, a mechanic or the like can remove the tire 18 and the wheel house 19 from the vehicle body 1 so that the mechanic can readily access functional parts in the engine compartment 31 that are not easy to be accessed from the bonnet 9.

The washer tank 2 is installed in the engine compartment 31 of the vehicle body 1 outwardly in the vehicle width direction thereof. The washer tank 2 is mounted at a more rearward position than the bumper 6 in the traveling direction of the vehicle body 1, closely behind the fog lamp (a functional part as a lamp body) 3 in the traveling direction of the vehicle body 1. The washer tank 2 is mounted closely before a bulkhead 27 for supporting the vehicle body structure in the traveling direction of the vehicle body 1, and at a more frontward position than the wheel house 19 and the tire 18 in the traveling direction of the vehicle body 1.

The washer tank 2 is provided with a through hole 11 penetrating a portion of the tank 2 that opposes the fog lamp 3 in the traveling direction. When the vehicle body 1 experiences a light collision at a frontward position of the traveling direction, the fog lamp 3 moves rearward of the traveling direction due to the collision, which means that the fog lamp 3 moves toward the through hole 11. Thus, even when the fog lamp 3 moves rearward, the fog lamp 3 gives no interference with the washer tank 2, or a longer moving distance can be secured until the fog lamp 3 interferes with the washer tank 2, so that it is possible to prevent the fog lamp 3 from coming in contact with the washer tank 2 to be damaged. When the fog lamp 3 gets damaged and needs to be replaced, a mechanic or the like can readily operate maintenance work on the fog lamp 3 such that the mechanic removes the tire 18 and the wheel house 19 from the vehicle body 1, and accesses the fog lamp 3 through the through hole 11.

A lamp body such as the fog lamp 3 generates heat when lighting. Heat generated by the fog lamp 3 is transferred by radiation or the like to the washer tank 2 that opposes the fog lamp 3. The washer tank 2 is provided with the through hole 11 such that a wall surface of the washer tank 2 that constitutes this through hole 11 opposes the fog lamp 3, so that the surface area of the washer tank 2 opposing the fog lamp 3 becomes larger. Thus, the heat generated by the fog lamp 3 can be efficiently transferred to the washer tank 2 through the surface of the washer tank 2 opposing the fog lamp 3, particularly, the wall surface of the washer tank 2 which constitutes the through hole 11 of the washer tank 2, so that washer solution is well-heated, thereby to provide an effect to prevent the washer solution from being frozen.

A center line 15 of the through hole 11 that divides the through hole 11 into two halves in the vehicle width direction is outwardly offset in the vehicle width direction relative to a center line 14 of the washer tank 2 that divides the washer tank 2 into two halves in the vehicle width direction. Specifically, the through hole 11 is formed to be outwardly offset relative to the washer tank 2 in the vehicle width direction of the vehicle body 1. This offset allows the through hole 11 to be provided at the most outward position of the washer tank 2 in the vehicle width direction of the vehicle body 1, so that a mechanic or the like can operate maintenance work on the fog lamp 3 through the through hole 11 at the most outward position in the vehicle width direction. This offset refers to such a manner in the washer tank 2 that an outward section 12 disposed more outwardly than the through hole 11 has a smaller width than that of an inward section 13 on an opposite side (more inwardly than) to the outward section 12 across the through hole 11.

The washer tank 2 is provided with a washer pump (for a front glass) 16 at a rearward position in the traveling direction of the vehicle body 1. Two pipes 4 are connected with the washer pump 16. One of the two pipes 4 is installed inside the engine compartment 31 and is connected with a washer nozzle 5 in vicinity of an upper end of the bonnet 9. The washer solution in the washer tank 2 flows in the pipe 4 by the washer pump 16, and is sprayed from the washer nozzle 5 against the front glass 32 disposed more rearward than the bonnet 9. The other of the two pipes 4 is installed toward a rearward position of the vehicle body 1 so as to be sprayed against a rear glass. The washer solution is supplied for the washer tank 2 via a water supply pipe 17 that extends right under the bonnet 9.

Figure 2:
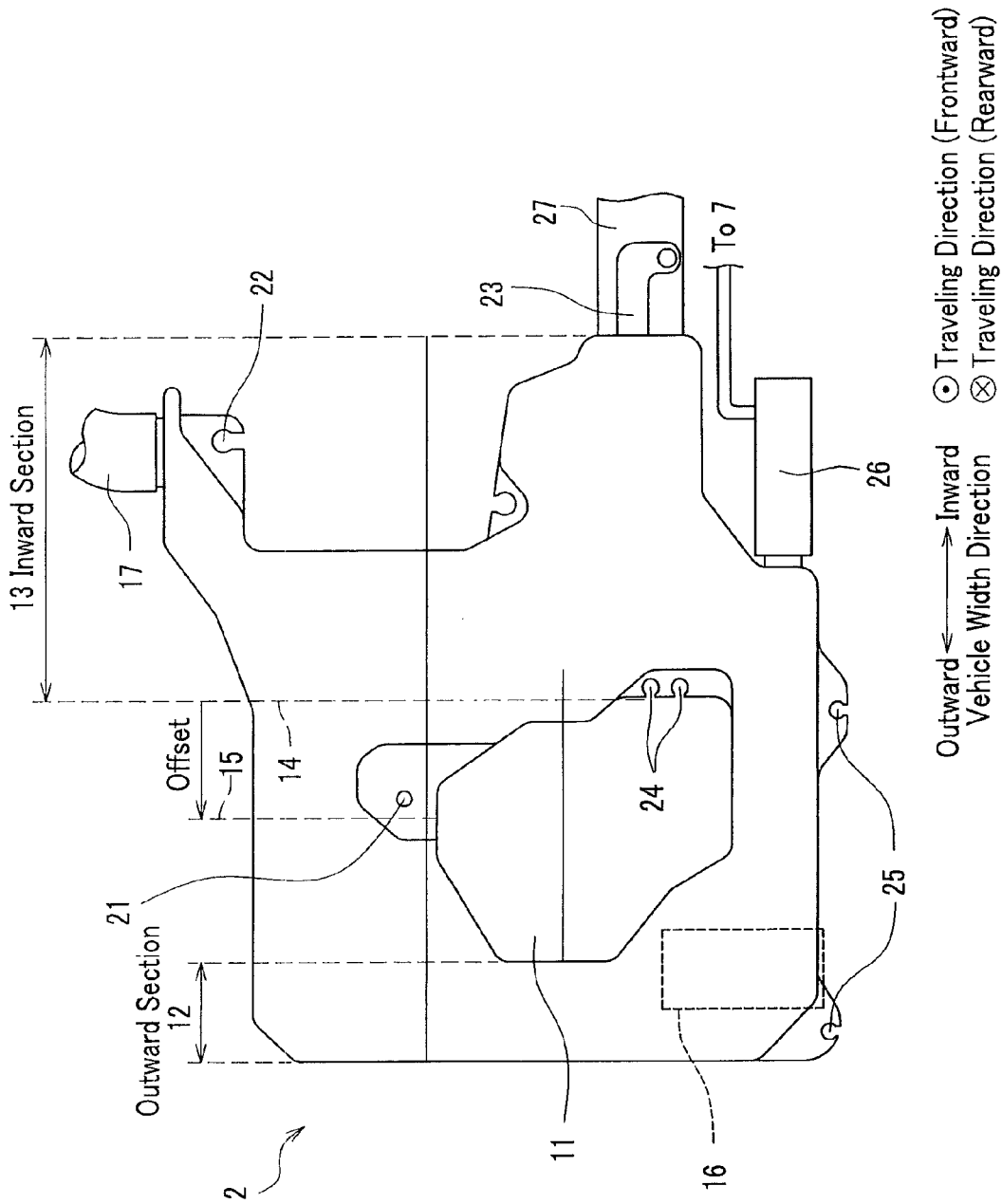
FIG. 2 is a front elevation view of a washer tank according to an embodiment of the present invention.

FIG. 2 is a front elevation view of the washer tank 2. The washer pump 16 is a pump for washing the front glass 32 and the rear glass (not shown), and is provided at a more rearward position than the washer tank 2 in the traveling direction of the vehicle body 1, and at a more outward position than the through hole 11 in the vehicle width direction of the vehicle body 1. A washer pump (for a head light) 26 may be additionally provided for washing the head light 7. In this case, the washer pump 26 is provided at a lower position of the washer tank 2, more inward than the through hole 11 in the vehicle width direction of the vehicle body 1.

The washer tank 2 has a wall surface that basically partitions the tank 2 between the inside and outside thereof, so as to reserve the washer solution therein. The washer tank 2 is provided with a first mounting portion 21, second mounting portions 22, 23, first pipe locking portions 24 and second pipe locking portions 25, and these locking portions are formed not in the wall surface of the washer tank 2 but in such a manner that holes or recessed portions are provided on plates continued from the wall surface. Since no through holes are formed in the wall surface, no washer solution is leaked outside the washer tank 2.

The first mounting portion 21 is formed such that a through hole is formed in a plate surrounded on three of the right and left and upper sides thereof by the wall surface, and whose other lower side faces the through hole 11. Since the first mounting portion 21 is formed in the edge portion facing the through hole 11, the washer tank 2 can be mounted to the vehicle body 1 closely to the center of gravity of the washer tank 2, so that the mounting condition of the washer tank 2 can be stable. Therefore, the first mounting portion 21 may be more preferably formed between the center line 14 of the washer tank 2 and the center line 15 of the through hole 11.

The second mounting portion 22 is formed such that a hook-shaped recessed portion opening downward is formed in a plate whose one side is continued from the wall surface of the washer tank 2 and whose other periphery faces the outside of the washer tank 2. The second mounting portion 22 is disposed at a position higher than the first mounting portion 21, and this position is the uppermost portion of the washer tank 2, where the water supply pipe 17 is connected. In addition, the second mounting portion 22 is formed at a more inward position than the first mounting portion 21 in the vehicle width direction of the vehicle body 1.

The second mounting portion 23 is provided at a lower position of the wall surface at an inward position in the washer tank 2 in the vehicle width direction of the vehicle body 1. In addition, this second mounting portion 23 is formed at a more inward position than the first mounting portion 21 in the vehicle width direction of the vehicle body 1.

The washer tank 2 is fixed at three points of the first mounting portion 21 and the pair of second mounting portions 22, 23 in total, and these three points are so arranged as to configure points of a triangle, thereby to enhance a mounting strength of the washer tank 2. The washer tank 2 is mounted with the pair of the second mounting portions 22, 23 to the vehicle body inwardly in the vehicle width direction, so that the mounting portions 22, 23 can accept a slight outward displacement of the washer tank 2 in vehicle width direction (the outward section 12) when operating maintenance work on the fog lamp 3 (see FIG. 1) from the outside of the vehicle width direction.

The first pipe locking portions 24 are formed of two hook-shaped recessed portions in a plate whose peripheral end is surrounded on three of upper, lower and right sides thereof by the wall surface of the washer tank 2, and whose other peripheral end on the left side (outwardly in the vehicle width direction) thereof faces the through hole 11, and the above two recessed portions 24 open at the periphery end on the left side. The first pipe locking portions 24 are formed at the edge portion facing the through hole 11 so that the pipes 4 (see FIG. 1) can be installed via (through) the through hole 11. The first pipe locking portions 24 are disposed in vicinity of the center line 14 of the washer tank.

The pair of the second pipe locking portions 25 are formed of two hook-shaped recessed portions in each plate whose one side is connected to the bottom wall face of the washer tank 2, and whose other peripheral end faces the outside of the washer tank 2.

FIG. 3 is a perspective view of the washer tank 2 of the vehicle body 1 and the vicinity thereof. The first mounting portion 21 is fixed to the bulk head 27 with a bolt/nut or the like. The second mounting portion 22 is fixed to a first supporting member 29 with a bolt/nut or the like, and the first supporting member 29 is fixed to a second supporting member 28 with a bolt/nut or the like. The second supporting member 28 is fixed to the bulk head 27 eventually. The second mounting portion 23 is fixed to the bulk head 27 with a bolt/nut or the like.

The two pipes 4 are connected with the washer pump 16. The two pipes 4 come from the rear side of the washer tank 2 in the traveling direction, where the pipes 4 are connected with the pump 16, across the bottom face of the washer tank 2 to the front side of the washer tank 2 in the traveling direction. The pipes 4 coming to the front side of the washer tank 2 in the traveling direction come up closely to the center (the center line 14) of the washer tank 2 of the through hole 11, and then go to the rear side of the washer tank 2 in the traveling direction. The pipes 4 can be installed without being bent, so that the pipes can be installed in a stable condition. The two pipes 4 are installed inwardly in the vehicle width direction of the vehicle body 1 until the pipes 4 from the washer pump 16 pass through the through hole 11. The two pipes 4 are fixed in the recessed portions of the second pipe locking portions 25 on the bottom face of the washer tank 2 thereby to be locked to the washer tank 2. The two pipes 4 are also fixed in the recessed portions of the first pipe locking portions 24 at the edge of the washer tank 2 that faces the through hole 11 thereby to be locked to the washer tank 2. In addition, each of the two pipes 4 is locked at two positions, i.e., at the first pipe locking portion 24 and the second pipe locking portion 25, and even when the pipes 4 are pulled in the vicinity of the bonnet 9, no tension due to this pull is transmitted to the connected portions of the pipes 4 to the washer pump 16, so that the pipes 4 do not come off the washer pump 16.

In the embodiment according to the present invention, as for the functional part, the fog lamp 3 that is mounted at a more frontward position than the washer tank 2 in the traveling direction of the vehicle body 1 has been exemplified, but the present invention is not limited to this, and another functional part such as a compressor or a receiver tank for an air conditioner may also be applicable.

According to the present invention, it is possible to provide a vehicle body structure for mounting a washer tank to a vehicle body, which prevents a functional part in vicinity of the washer tank from being damaged when the functional part comes in contact with the washer tank at the time of a light collision.

The embodiment according to the present invention has been explained as aforementioned. However, the embodiment of the present invention is not limited to those explanations, and those skilled in the art ascertain the essential characteristics of the present invention and can make the various modifications and variations to the present invention to adapt it to various usages and conditions without departing from the spirit and scope of the claims.

What is claimed is:

1. A vehicle body structure for mounting a washer tank to a vehicle body comprising:
    a washer tank for being mounted to the vehicle body; and
    a functional part provided at a more frontward position than the washer tank in a traveling direction of the vehicle body,
    wherein the washer tank is provided with a through hole at a position opposing the functional part, and the through hole penetrates through the washer tank in the traveling direction of the vehicle body.

2. The vehicle body structure for mounting a washer tank to a vehicle body according to the claim 1, wherein
    the washer tank is provided outwardly in a vehicle width direction of the vehicle body that is perpendicular to the traveling direction of the vehicle body, the through hole is formed to be outwardly offset relative to the washer tank in the vehicle width direction of the vehicle body, and in the washer tank, an outward section disposed more outwardly than the through hole has a smaller width than that of an inward section on an opposite side to the outward section across the through hole.

3. A vehicle body structure for mounting a washer tank to a vehicle body comprising:

a washer tank for being mounted to the vehicle body; and a functional part provided at a more frontward position than the washer tank in a traveling direction of the vehicle body, wherein the washer tank is provided with a through hole at a position opposing the functional part, and the through hole penetrates through the washer tank in the traveling direction of the vehicle body;

a washer pump is provided outwardly in the vehicle width direction that is perpendicular to the traveling direction of the vehicle body, and at least one pipe connected with the washer pump is installed through the through hole and inwardly in the vehicle width direction of the vehicle body.

4. The vehicle body structure for mounting a washer tank to a vehicle body according to the claim 2, wherein a washer pump is provided outwardly in the vehicle width direction that is perpendicular to the traveling direction of the vehicle body, and at least one pipe connected with the washer pump is installed through the through hole and inwardly in the vehicle width direction of the vehicle body.

5. The vehicle body structure for mounting a washer tank to a vehicle body according to the claim 3, wherein the pipe is locked to an edge of the washer tank that faces the through hole.

6. The vehicle body structure for mounting a washer tank to a vehicle body according to the claim 4, wherein the pipe is locked to an edge of the washer tank that faces the through hole.

7. The vehicle body structure for mounting a washer tank to a vehicle body according to the claim 1, wherein an edge of the washer tank that faces the through hole is provided with a first mounting portion for attaching the washer tank to the vehicle body.

8. The vehicle body structure for mounting a washer tank to a vehicle body according to the claim 2, wherein an edge of the washer tank that faces the through hole is provided with a first mounting portion for attaching the washer tank to the vehicle body.

9. The vehicle body structure for mounting a washer tank to a vehicle body according to the claim 3, wherein an edge of the washer tank that faces the through hole is provided with a first mounting portion for attaching the washer tank to the vehicle body.

10. The vehicle body structure for mounting a washer tank to a vehicle body according to the claim 4, wherein an edge of the washer tank that faces the through hole is provided with a first mounting portion for attaching the washer tank to the vehicle body.

11. The vehicle body structure for mounting a washer tank to a vehicle body according to the claim 7, wherein the washer tank is provided with a pair of second mounting portions at a more inward position than the first mounting portion in the vehicle width direction of the vehicle body, and one of the second mounting portions is disposed at a higher position and the other of the second mounting portions is disposed at a lower position than the first mounting portion.

12. The vehicle body structure for mounting a washer tank to a vehicle body according to the claim 8, wherein the washer tank is provided with a pair of second mounting portions at a more inward position than the first mounting portion in the vehicle width direction of the vehicle body, and one of the second mounting portions is disposed at a higher position and the other of the second mounting portions is disposed at a lower position than the first mounting portion.

13. The vehicle body structure for mounting a washer tank to a vehicle body according to the claim 9, wherein the washer tank is provided with a pair of second mounting portions at a more inward position than the first mounting portion in the vehicle width direction of the vehicle body, and one of the second mounting portions is disposed at a higher position and the other of the second mounting portions is disposed at a lower position than the first mounting portion.

14. The vehicle body structure for mounting a washer tank to a vehicle body according to the claim 10, wherein the washer tank is provided with a pair of second mounting portions at a more inward position than the first mounting portion in the vehicle width direction of the vehicle body, and one of the second mounting portions is disposed at a higher position and the other of the second mounting portions is disposed at a lower position than the first mounting portion.

15. The vehicle body structure for mounting a washer tank to a vehicle body according to the claim 1, wherein the functional part comprises a lamp body.

16. The vehicle body structure for mounting a washer tank to a vehicle body according to the claim 2, wherein the functional part comprises a lamp body.

17. The vehicle body structure for mounting a washer tank to a vehicle body according to the claim 3, wherein the functional part comprises a lamp body.

18. The vehicle body structure for mounting a washer tank to a vehicle body according to the claim 4, wherein the functional part comprises a lamp body.

* * * * *